United States Patent
Pandharipande (10) Patent No.: US 12,063,728 B2
(45) Date of Patent: Aug. 13, 2024

(54) LIGHTING CONTROL SYSTEM EMPLOYING SOCIAL SENSING FEEDBACK

(71) Applicant: SIGNIFY HOLDING B.V., Eindhoven (NL)

(72) Inventor: Ashish Vijay Pandharipande, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/766,898

(22) PCT Filed: Oct. 1, 2020

(86) PCT No.: PCT/EP2020/077450
§ 371 (c)(1),
(2) Date: Apr. 6, 2022

(87) PCT Pub. No.: WO2021/069283
PCT Pub. Date: Apr. 15, 2021

(65) Prior Publication Data
US 2024/0098859 A1    Mar. 21, 2024

(30) Foreign Application Priority Data
Oct. 10, 2019    (EP) .................................. 19202469

(51) Int. Cl.
*H05B 47/105*    (2020.01)
(52) U.S. Cl.
CPC .................................. *H05B 47/105* (2020.01)
(58) Field of Classification Search
None
See application file for complete search history.

(56) References Cited

U.S. PATENT DOCUMENTS 9,501,928 B1    11/2016    Bell et al.
9,795,004 B2 *  10/2017    Blum ................. H05B 47/11
(Continued)

FOREIGN PATENT DOCUMENTS

KR    20160046473 A    4/2016
KR    101896216 B1    9/2018
(Continued)

OTHER PUBLICATIONS

Guiseppe Anastasi, et al., "Urban and Social Sensing for Sustainable Mobility in Smart Cities", www.researchgate.net/publication/261448553, 2013, pp. 1-4.
(Continued)

*Primary Examiner* — Srinivas Sathiraju (57) ABSTRACT

A lighting control system (1) comprising at least one lighting module (2) and a controller (3), the controller (3) being configured to cause the at least one lighting module to create a lighting scene for a lighting calendar event, the controller (3) further being configured to obtain first data by data mining social media content relating to the lighting calendar event, determine first lighting attributes from the first data, based on the first lighting attributes, control the at least one lighting module to generate at least one lighting scene and apply the at least one lighting scene for the lighting calendar event, obtain second data by data mining social media content relating to the applied at least one lighting scene, determine second lighting attributes from the second data, and based on the second lighting attributes control the at least one lighting module to generate at least one updated lighting scene and apply the at least one updated lighting scene for the lighting calendar event.

15 Claims, 5 Drawing Sheets

(56) References Cited

U.S. PATENT DOCUMENTS

| | | | |
|---|---|---|---|
| 9,915,416 B2* | 3/2018 | Chemel | G01D 18/00 |
| 10,555,399 B2* | 2/2020 | Krajnc | H05B 47/105 |
| 10,609,787 B2* | 3/2020 | Meerbeek | H05B 47/12 |
| 10,631,381 B2* | 4/2020 | Krajnc | H05B 47/155 |
| 11,690,111 B1* | 6/2023 | Sculley | H04W 4/30 |
| | | | 340/870.07 |
| 2015/0184842 A1* | 7/2015 | Chemel | H05B 47/115 |
| | | | 702/104 |
| 2015/0296594 A1* | 10/2015 | Blum | H05B 45/20 |
| | | | 315/158 |
| 2017/0026194 A1 | 1/2017 | Vijayrao et al. | |
| 2017/0301213 A1 | 10/2017 | Davis et al. | |
| 2019/0098725 A1* | 3/2019 | Sadwick | F21S 2/00 |
| 2019/0230775 A1* | 7/2019 | Krajnc | H05B 47/155 |
| 2019/0261484 A1* | 8/2019 | Krajnc | H05B 47/1965 |
| 2024/0098859 A1* | 3/2024 | Pandharipande | H05B 47/105 |

FOREIGN PATENT DOCUMENTS

| | | | |
|---|---|---|---|
| WO | 2014064640 A1 | | 5/2014 |
| WO | 2015049617 A1 | | 4/2015 |
| WO | 2016088006 A1 | | 6/2016 |
| WO | 2018037009 A1 | | 8/2017 |
| WO | 2018065342 A1 | | 4/2018 |
| WO | WO-2021058191 A1 | * | 4/2021 |

OTHER PUBLICATIONS

Ruben Mayer, et al., "The Fog Makes Sense: Enabling Social Sensing Services With Limited Internet Connectivity", SocialSens '17, Apr. 21, 2017, Pittsburgh, PA, USA, pp. 1-6.

Dong Wang, et al., "Social Sensing Trends and Applications", Science Direct, Aug. 23, 2019, pp. 1-19.

\* cited by examiner

| Conversation | Sentiment/Emotion |
|---|---|
| he's pointing to purple lights in the Empire State Building | Positive/Joy |
| omg omg @EmpireStateBldg lighting up purple for @BTS twt is EVERYTHING | Positive/Joy |
|  | Poitive/excitement |

LIGHTING CONTROL SYSTEM EMPLOYING SOCIAL SENSING FEEDBACK

CROSS-REFERENCE TO PRIOR APPLICATIONS

This application is the U.S. National Phase application under 35 U.S.C. § 371 of International Application No. PCT/EP2020/077450, filed on Oct. 1, 2020, which claims the benefit of European Patent Application No. 19202469.3, filed on Oct. 10, 2019. These applications are hereby incorporated by reference herein.

FIELD OF THE INVENTION

The invention relates to a lighting control system comprising at least one lighting module and a controller, the at least one lighting module and the controller being adapted for causing the at least one lighting module to create a lighting scene for a lighting calendar event.

BACKGROUND OF THE INVENTION

As used herein, the terms "lighting calendar event" and "lighting event" are intended to encompass any event, whether large or small, in connection with which it may be desired to employ lighting scenes by use of a lighting control system according to the invention. Non-limiting examples of such events include musical events, sport events, cultural events and the like. Musical events may for example be anything from a single concert to a music festival. Sport events may for example be anything from a single game, such as a football match, to a world cup or the Olympic Games.

As used herein, the term "lighting venue" is intended to refer to the venue or place in which a given lighting control system is installed and is intended to light up when in operation. The term lighting venue is thus intended to encompass, in principle, any feasible place in which it may be desired to install a lighting control system according to the invention. Non-limiting examples include stadiums, buildings, squares and bridges.

As used herein, the term "landmark" is, in line with the general understanding of this term, intended to encompass objects or features of a landscape or town that is easily seen and recognized from a distance, and especially such objects, features, monuments or buildings being of historical or other importance. Non-limiting examples could be the Empire State Building, the Eiffel Tower, the Brandenburger Tor and the Tower Bridge.

As used herein, the term "lighting scene" is intended to refer to the actual lighting displayed by a lighting control system according to the invention during a lighting event.

Growing adoption of information and communication technologies in infrastructures, use of smartphones and social media platforms is bringing about a large amount of data. Analysis and interpretation of this data can enable a good understanding of our socioeconomic environment, impact of events, reaction of users etc. The acquisition and analysis of content of social media, such as Twitter, Instagram and Facebook, is termed social sensing, and offers a new lens into the physical world through the eyes of the social network. Analytics performed on this large volume of data posted on these media can be used to realize new applications and services. The extraction and analysis of data from such media is generally known as data mining.

For instance, US 2019/0261484 A1 discloses a method for automatically creating lighting settings based on an image or images. An event associated with such images can be detected, such as the uploading of a number of photos to a gallery, or the posting of an image on social media. By assessing the event, and the image or images, it is possible to determine whether and how to create a new lighting scene. If multiple images are present, it may be possible to group or merge the images to down-select to one or a small number of images, or image parameters. The lighting scene or scenes can then be created based on these images or parameters.

The design of lighting scenes is currently done in ad hoc ways, and is largely in the purview of a lighting designer. There is no feedback mechanism to base a lighting design upon, or to design lighting scenes based on specific characteristics of an event. These design principles also extend when illuminating multiple landmarks at a close-by location (bridges along a river) or in different locations (landmark buildings in different cities).

Furthermore, historic buildings, monuments and bridges are important landmarks that are tourism hot spots and a source of local civic pride. Properly lit landmarks have a profound impact on ambiance and on how people perceive and experience their environment. Lighting of landmarks can however be a significant cost; for instance, the cost for lighting the Eiffel Tower with traditional technologies is close to one million dollars per year.

There is thus a desire to provide a lighting control system enabling the use of social sensing for lighting scene content management and control. There is furthermore a desire to provide a lighting control system enabling the use of social sensing for lighting control of multiple lighting venues, such as landmarks, by thematically controlling them. There is further a desire to provide a lighting control system enabling these features in an efficient and quick manner enabling fast updates of the lighting scene using as little processor power and memory space as possible.

Still further there is a desire to provide a lighting control system enabling considerable energy savings in lighting and reduction of light pollution, together with achieving dynamic and flexible dimming and color control, and in turn dynamic illumination effects to enhance nighttime visual aesthetics, used as an artistic medium to connect with people and the environment, and also to enable new value streams using scene management.

SUMMARY OF THE INVENTION

It is an object of the present invention to overcome this problem, and to provide a lighting control system enabling the use of social sensing for lighting scene content management and control.

It is a further object of the present invention to provide a lighting control system enabling the use of social sensing for lighting control of multiple lighting venues, such as landmarks, by thematically controlling them.

It is a still further object of the present invention to provide such a lighting control system which is efficient and quick such as to enable fast updates of lighting scenes using as little processor power and memory space as possible.

It is yet another object of the present invention to provide a lighting control system enabling considerable energy savings in lighting and reduction of light pollution, together with achieving dynamic and flexible dimming and color control, and in turn dynamic illumination effects to enhance nighttime visual aesthetics, used as an artistic medium to connect with people and the environment, and also to enable new value streams using scene management.

According to a first aspect of the invention, this and other objects are achieved by means of a lighting control system comprising at least one lighting module and a controller, the controller being configured to control the at least one lighting module to create a lighting scene for a lighting calendar event, the controller further being configured to: obtain first data by data mining social media content relating to the lighting calendar event; determine at least one first lighting attribute from the first data; based on the at least one first lighting attribute, control the at least one lighting module to generate at least one lighting scene and apply the at least one lighting scene for the lighting calendar event; obtain second data by data mining social media content relating to the applied at least one lighting scene; determine at least one second lighting attribute from the second data; based on the at least one second lighting attribute control the at least one lighting module to generate at least one updated lighting scene and apply the at least one updated lighting scene for the lighting calendar event.

Thereby, and particularly by obtaining data by data mining on social media and using and combining the thus obtained data as described above, a lighting control system enabling the use of social sensing for lighting scene content management and control is provided for. Such a lighting control system is in virtue of the manner in which the data is obtained efficient and quick, enables fast updates of lighting scenes and uses very little processor power and memory space.

Furthermore, such a lighting control system enables considerable energy savings in lighting and reduction of light pollution, together with achieving dynamic and flexible dimming and color control, and in turn dynamic illumination effects to enhance nighttime visual aesthetics, used as an artistic medium to connect with people and the environment, and also enables new value streams using scene management.

In an embodiment the controller is further configured to obtain third data by one of repeated data mining and real time data mining social media content relating to the lighting calendar event during the course of the lighting calendar event, determine at least one third lighting attribute from the third data, and based on the at least one second lighting attribute and the at least one third lighting attribute control the at least one lighting module to generate the at least one updated lighting scene and apply the at least one updated lighting scene for the lighting calendar event.

Thereby, a lighting control system is provided with which the above mentioned advantages are improved further, especially as the real time or repeated data mining on social media content relating to the lighting event provides for an even more dynamically adaptable lighting control system.

In an embodiment, the second data is obtained by any one of repeated data mining and real time data mining of social media content relating to the applied at least one lighting scene during the course of the lighting calendar event.

Thereby, real time monitoring of reactions relating to the lighting scene is obtained, which in turn provides for particularly fast and relevant updates of the lighting scene as the lighting event occurs.

As mentioned, the controller is configured to obtain first data by data mining social media content relating to the lighting calendar event. The lighting calendar event may be a scheduled event; such as for example illuminating the Empire State Building with red, white and blue colors on Independence Day every year, or similar. The duration of the lighting calendar event may e.g. be minutes, hours, days, or weeks.

Regarding obtaining the first data: The social media content is relating to the lighting calendar event, or phrased differently in aspects: the social media content is associated with the lighting calendar event, or the social media content may be mined on the lighting calendar event, or the social media content is indicative of the lighting calendar event. Similarly, regarding obtaining the second data: The social media content is relating to the applied at least one lighting scene, or phrased differently in aspects: the social media content is associated with the applied at least one lighting scene, or the social media content may be mined on the applied at least one lighting scene, or the social media content is indicative of the applied at least one lighting scene. Similarly, regarding obtaining the third data: The social media content is relating to the lighting calendar event during the course of the lighting calendar event, or phrased differently in aspects: the social media content is associated with the lighting calendar event during the course of the lighting calendar event, or the social media content may be mined on the lighting calendar event during the course of the lighting calendar event, or the social media content is indicative of the lighting calendar event during the course of the lighting calendar event.

Moreover, as mentioned, the controller is configured to determine at least one first lighting attribute from the first data, and determine at least one second lighting attribute from the second data, and determine at least one third lighting attribute from the third data. In aspects: The respective lighting attribute may be a lighting setting. Respectively, said determining may be phrased as deriving or extracting. In aspects, the updated lighting scene may comprise respectively the at least one second lighting attribute. In aspects, the updated lighting scene may comprise respectively the at least one second lighting attribute and the at least one third lighting attribute. Moreover, the lighting scene and the updated lighting scene may be projected onto a landmark associated with the lighting calendar event. Furthermore, the first data may be obtained before (a date of, or: a duration of, or: an occurrence of) the lighting calendar event.

Hence, as partly phrased before, the updated lighting scene applied by the at least one lighting module for the lighting calendar event may be based on both the mined social media content related to both the lighting calendar event itself, as well as the mined social media content related to the initially rendered lighting scene (during the lighting calendar event). Basing a lighting scene on both such inputs is advantageous, as (during the lighting calendar event) the current social sensing feedback to the lighting scene may be taken into account, and the applied (i.e. rendered) lighting scene may be improved to an updated lighting scene more favorable to the environment.

In an embodiment, the controller is further configured to classify the at least one first lighting attribute, thereby obtaining classified first lighting attributes, and based on the classified first lighting attributes, control the at least one lighting module to generate at least one lighting scene and apply the at least one lighting scene for the lighting calendar event.

In an alternative or additional embodiment, the controller is further configured to classify at least one of the at least one second lighting attribute and the at least one third lighting attribute, thereby obtaining classified second lighting attributes and classified third lighting attributes, and based on at least one of the classified second lighting attributes and the classified third lighting attributes control the at least one lighting module to generate the at least one updated lighting scene and apply the at least one updated lighting scene for the lighting calendar event.

Classification may for instance be performed based on at least one of geographical data, sentiment data and emotion data achieved through said data mining on social media.

Classification of the data provides the possibility of updating a lighting scene based on further parameters, such as topics (e.g. safety, light pollution), sentiments (e.g. positive, negative, neutral) and emotions (e.g. joy, excitement, sadness, anger). Thereby, it becomes possible to not only use e.g. live conversations in the vicinity of a lighting scene (established using time and geo-tag information) to adapt a lighting scene, but also to use the classified data to, e.g., adapt the lighting scene based on data classified to evoke that positive sentiments and emotions may get replicated and/or adapted, while data classified to evoke negative sentiments and emotions may be dropped. Social media data sensing based on topics and sentiments may also be used to create links between events, places, venues and the like.

In an embodiment, at least one of the second data and the third data are further obtained by repeated data mining social media content relating to the applied lighting scene subsequently to the lighting calendar event having ended.

Thereby, real time monitoring of reactions relating to the lighting scene is obtained also subsequent to the event itself having ended. This in turn provides for particularly fast and relevant updates of the lighting scene also in the aftermath of the lighting event, for instance as an audience is leaving the lighting venue and/or are on their way home through the city of the venue.

In an embodiment, the controller is further configured to create and/or manage lighting scenes of a lighting event subsequent to the lighting calendar event taking into account at least one of the at least one first lighting attribute, the at least one second lighting attribute, the at least one third lighting attribute, the at least one first classified lighting attribute, the at least one second classified lighting attribute and the at least one third classified lighting attribute.

Thereby, future lighting scenes for future lighting events may be planned and carried out using data relating to previous lighting event. This in turn provides for a lighting control system being even more efficient and quick at least in terms of providing a relevant lighting scene for a given lighting event, and which uses as little processor power and memory space, and thus as little electrical energy, for this purpose as possible.

The lighting control system may be arranged at or linked to a lighting venue. The lighting venue may be a landmark.

In an embodiment, the controller is further configured to obtain information regarding at least one of first lighting attributes, second lighting attributes, third lighting attributes, first classified lighting attributes, second classified lighting attributes and third classified lighting attributes related to lighting scenes created by a further lighting control system, and create the lighting scene of the lighting calendar event taking into account the thus obtained information.

In an embodiment, the further lighting control system is arranged at or linked to a further lighting venue. The further lighting venue may be a further landmark.

Other social sensing data, such as accelerometer, GPS and/or Bluetooth data, may be used to obtain trajectories of users in connection with lighting venues, and also identify hot spots. This can be used to establish a connectivity between lighting venues, e.g. based on volume of people or on movement, such as to link lighting venues and their associated lighting control systems.

Thereby, a lighting control system is provided which may be linked or connected to other lighting control systems in a particularly efficient manner. Such a lighting control system may further be used to establish a link between two venues, e.g. landmarks, to create lighting scenes at the two venues to emphasize connections between the venues, e.g. a harmony or a historic/artistic (dis)similarity and/or to create lighting scenes to celebrate events that may be relevant to two landmarks in an efficient and simple manner using as little processor power and memory space, and thus as little electrical energy, for this purpose as possible.

In an embodiment, the data mining comprises one or more of social text mining, social multimedia mining (social image mining and social video mining), social sensor mining (mining of sensor data from smartphones) and emoticon processing.

Especially using two or more of such data mining types provide for a greater diversity in the data used to create the lighting scene.

In an embodiment, the at least one lighting module comprises a plurality of light sources adapted for, in operation, emitting light, and the controller is adapted for causing the at least one lighting module to provide, using the plurality of light sources, a light output with desired light properties, the light properties comprising one or more of color, glow, color temperature, intensity and shape.

In an embodiment, the lighting control system further comprises a data processing unit and a memory unit, the memory unit comprising stored instructions which, when executed by the data processing unit, causes the data processing unit to control or operate the controller in accordance with any of the above embodiments.

In a second aspect of the invention, the above and other objects are achieved by means of a method for operating a lighting control system comprising at least one lighting module and a controller, where the controller is configured to perform the following steps: obtain first data by data mining social media content relating to the lighting calendar event; determine at least one first lighting attribute from the first data; based on the at least one first lighting attribute, control the at least one lighting module to generate at least one lighting scene and apply the at least one lighting scene for the lighting calendar event; obtain second data by data mining social media content relating to the applied at least one lighting scene; determine at least one second lighting attribute from the second data; based on the at least one second lighting attribute control the at least one lighting module to generate at least one updated lighting scene and apply the at least one updated lighting scene for the lighting calendar event.

In an embodiment of the method according to the invention, the controller is configured to perform the following steps: obtain third data by one of repeated data mining and real time data mining of social media content relating to the lighting calendar event during the course of the lighting calendar event; determine at least one third lighting attribute from the third data; and based on the at least one second lighting attribute and the at least one third lighting attribute control the at least one lighting module to generate at least one updated lighting scene and apply the at least one updated lighting scene for the lighting calendar event.

In an embodiment of the method according to the invention, the controller is configured to perform the following steps: classify the at least one first lighting attribute, thereby obtaining at least one classified first lighting attribute, and based on the at least one classified first lighting attribute, control the at least one lighting module to generate at least one lighting scene and apply the at least one lighting scene for the lighting calendar event.

In an embodiment of the method according to the invention, the controller is configured to perform the following steps: classify at least one of the at least one second lighting attribute and the at least one third lighting attribute, thereby obtaining at least one classified second lighting attribute and at least one classified third lighting attribute; and based on the at least one classified second lighting attribute and the at least one classified third lighting attribute control the at least one lighting module to generate the at least one updated lighting scene and apply the at least one updated lighting scene for the lighting calendar event.

In an embodiment of the method according to the invention, the controller is configured to perform the following steps: create and/or manage lighting scenes of a lighting event subsequent to the lighting calendar event taking into account at least one of the first lighting attributes, the second lighting attributes, the third lighting attributes, the first classified lighting attributes, the second classified lighting attributes and the third classified lighting attributes.

In an embodiment of the method according to the invention, the controller is configured to perform the following steps: obtain information regarding at least one of first lighting attributes, second lighting attributes, third lighting attributes, first classified lighting attributes, second classified lighting attributes and third classified lighting attributes related to lighting scenes created by a further lighting control system; and create the lighting scene of the lighting calendar event taking into account the thus obtained information.

Thereby, advantages and/or embodiments applying to the control system according to the invention may mutatis mutandis apply to said method according to the invention.

In a third aspect the invention, the above and other objects are achieved by means of a computer program product for a computing device, the computer program product comprising computer program code to perform the method according to the second aspect of the invention when the computer program product is run on a processing unit of the computing device.

The present invention, such as the control system, method and computer program product, may mutatis mutandis apply to lighting calender events in an indoor venue, such as within a retail domain. The venue may for example be a stand or a show of a new collection, etc.

It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention.

It is noted that like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
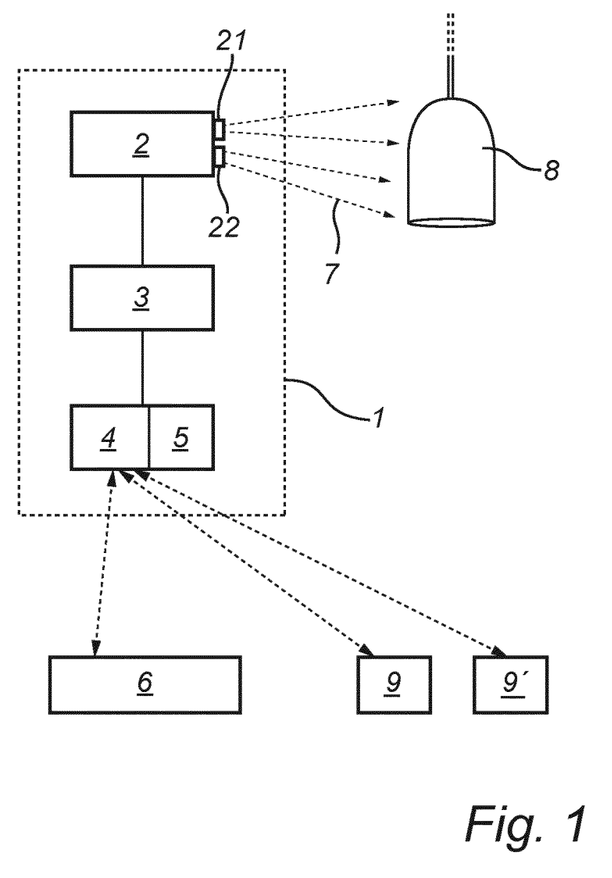
FIG. 1 shows a schematic diagram illustrating a lighting control system according to the invention.

FIG. 1 shows a schematic diagram of a lighting control system 1 according to the invention. The lighting control system 1 comprises a lighting module 2 and a controller 3. The lighting control system 1 may further comprise a processor or data processing unit 4 and a memory unit 5. The data processing unit 4 and the memory unit 5 may, where provided, form part of or be integrated in the controller 3 or may be separate elements. The lighting control system 1 is arranged at or linked to a lighting venue, such as for example a landmark 8.

In the embodiment shown, the lighting control system 1 comprises one lighting module 2. Alternatively, the lighting control system 1 may comprise more than one lighting module 2, such as e.g. two, three or four lighting modules 2. The lighting module 2, or each lighting module 2, comprises a plurality of light sources 21, 22. Any number of such light sources 21, 22 may be provided. The light sources 21, 22 may be way of example be LEDs. The lighting module may e.g. be a (pixilated) spotlight. Generally, the light sources 21, 22 are adapted for, in operation, emitting light. The light emitted by the light sources 21, 22 may have any color and/or color temperature. Generally, the light sources 21, 22 are configured to be controllable by means of a controller 3.

The controller 3 is generally configured to cause one or more lighting module 2 to create a lighting scene for a selected lighting calendar event. The controller 3 is adapted for causing the at least one lighting module 2, and more particularly the plurality of light sources 21, 22, to provide a light output 7 with desired light properties and to apply the light output 7 to a venue 8. The light properties may comprise one or more of color, glow, color temperature, intensity and shape. The light properties may alternatively comprise a scene, a modulation, or a light recipe.

Figure 2:
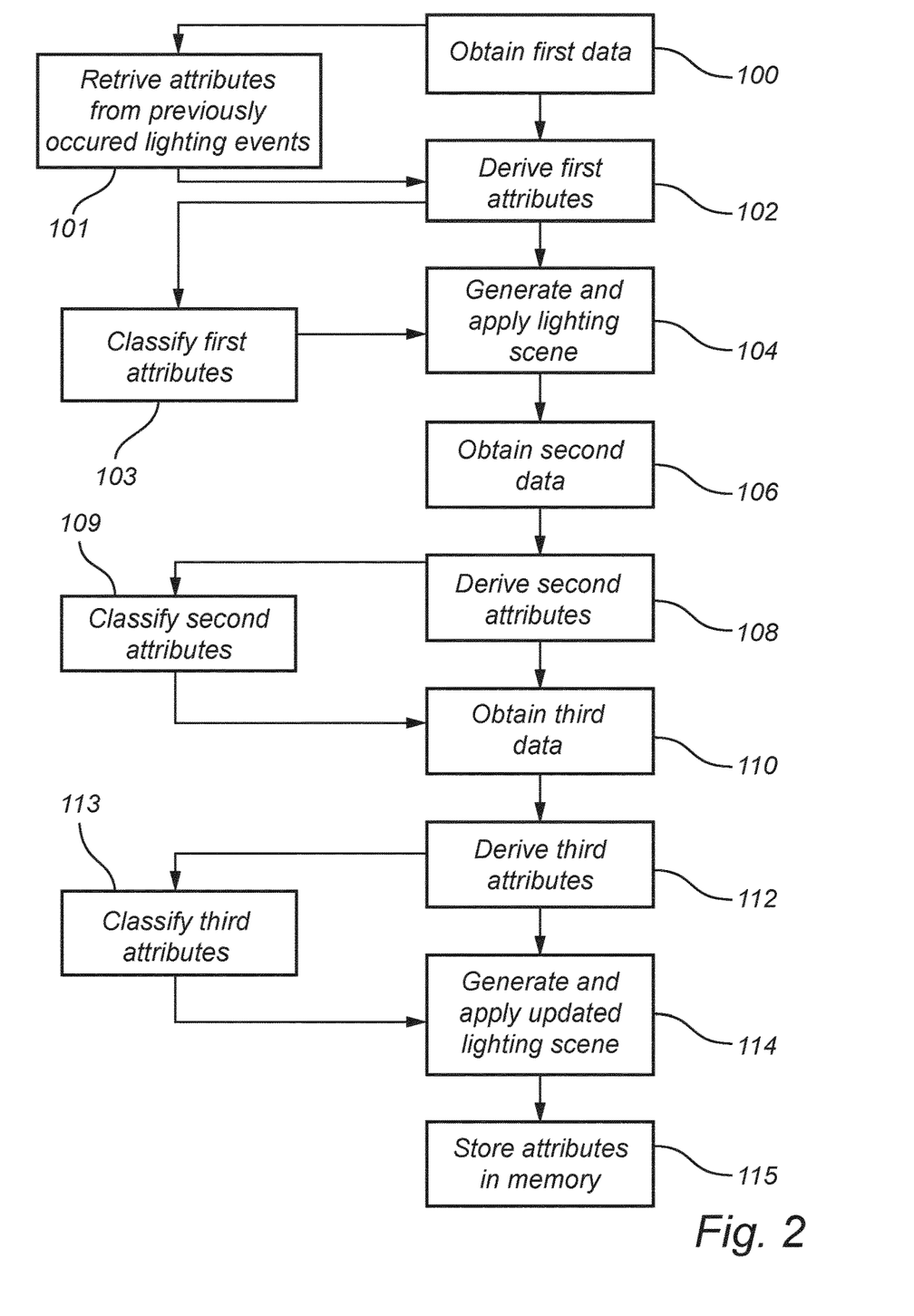
FIG. 2 shows a schematic diagram illustrating a method according to the invention.

The controller 3 is generally configured to perform a series of tasks, steps or actions, which are also illustrated schematically in FIG. 2.

In embodiments where the lighting control system 1 comprises a data processing unit 4 and a memory unit 5, the memory unit 5 comprises stored instructions. The instructions stored in the memory unit 5 causes, when executed by the data processing unit 4, the data processing unit 4 to cause or operate the controller 3 to perform the series of tasks, steps or actions, which are illustrated schematically in FIG. 2.

The series of tasks, steps or actions include the following.

Obtaining 100 first data by performing data mining on content of the lighting calendar event on social media 6. The first data is obtained by a single data mining process, but may alternatively also be obtained by one of repeated data mining and real time data mining. The first data is obtained before the lighting calendar event takes place. Alternatively, or additionally, first data may also be obtained at the onset of the lighting calendar event or during the initial phase(s) of the lighting calendar event. It is noted that social media content relating to the lighting calendar event may also be social media content indicative of the lighting calendar event.

Determining 102 one or more first lighting attributes from the first data. Generally, by means of non-limiting examples, lighting attributes may relate to e.g. one or more of color, glow, color temperature, intensity and shape. Further examples are given in examples 1-3 described further below.

Based on the one or more first lighting attributes, controlling 104 the at least one lighting module 2 to generate at least one lighting scene and apply the at least one lighting scene for the selected lighting calendar event, for instance by illuminating a venue 8 (FIG. 1), such as a landmark.

Obtaining 106 second data by data mining social media content relating to the at least one lighting scene applied in step 104. The second data may be obtained by a single data mining process, or alternatively by one of repeated data mining and real time data mining. The second data is obtained during the lighting calendar event. Alternatively, or additionally, second data may also be obtained before or at the onset of the lighting calendar event in case the lighting scene is applied a period of time, e.g. some hours, before the lighting calendar event actually begins.

Determining 108 one or more second lighting attributes from the second data.

Optionally obtaining 110 third data by data mining social media content relating to the lighting calendar event during the course of the lighting calendar event. The third data is obtained by one of repeated data mining and real time data mining, but may also alternatively be obtained by a single data mining process.

Optionally determining 112 one or more third lighting attributes from the third data.

Finally, based on the one or more second lighting attributes, and if steps 110 and 112 are performed optionally also the one or more third lighting attributes, controlling 114 the at least one lighting module 2 to generate at least one updated lighting scene and apply the at least one updated lighting scene for the lighting calendar event. Thereby, the lighting scene, for instance the illumination of the venue 8, is changed based on the data mining performed.

The data mining performed in steps 100, 106 and 110 may comprise one or more of social text mining, social multimedia mining, such as social image mining and/or social video mining, social sensor mining, such as mining of sensor data from smartphones, and emoticon processing. The social media 6 on which the data mining is performed may be any social media, such as for example Facebook, Instagram, Twitter etc.

The series of tasks, steps or actions may also include any one or more of the following steps 103, 109 and 113, which are all optional.

Classifying 103 the one or more first lighting attributes, thereby obtaining one or more classified first lighting attributes.

When one or more classified first lighting attributes are obtained, step 104 implies controlling the at least one lighting module 2 to generate at least one lighting scene and apply the at least one lighting scene for the selected lighting calendar event based on the one or more classified first lighting attributes.

Classifying 109 the second lighting attributes, thereby obtaining one or more classified second lighting attributes.

Classifying 113 the third lighting attributes, thereby obtaining one or more classified third lighting attributes.

Step 114 then implies based on at least one of the one or more classified second lighting attributes and the one or more classified third lighting attributes, controlling the at least one lighting module 2 to generate the at least one updated lighting scene and apply the at least one updated lighting scene for the lighting calendar event.

In any of steps 103, 109 and 113, the classification performed may be based on one or more of geographical data, sentiment data and emotion data achieved through said data mining social media content relating to the lighting calendar event.

Additionally the controller 3 may further be configured to create and/or manage lighting scenes of a further lighting event taking place subsequent to the lighting calendar event taking into account at least one of the first lighting attributes, the second lighting attributes, the third lighting attributes, the first classified lighting attributes, the second classified lighting attributes and the third classified lighting attributes obtained in connection with the lighting calendar event as described above. This is illustrated in FIG. 2 by means of an optional step 101, in which lighting attributes related to one or more previous lighting events is retrieved by the controller 3, e.g. from a memory unit such as the memory unit 5. To this end, the controller 3 may further be configured to, in a step 115, store the obtained lighting attributes, whether classified or not, in the memory unit 5 or in another suitable memory unit for future use.

Referring again to FIG. 1 the lighting control system 1, and particularly the controller 3 or, where provided, the data processing unit 4, may be in communicative contact with one or more further lighting control systems 9, 9' such as to enable data exchange between the lighting control systems 1, 9, 9'. In the examples below, such a lighting control system 1 is also denoted as a connected lighting control system 1. To this end the lighting control system 1 may comprise a transmitter/receiver configured to communicate with a transmitter/receiver of the one or more further lighting control systems 9, 9'. The further lighting control systems 9, 9' may be arranged at or linked to further lighting venues, such as for example further landmarks. This setup makes another optional step or action possible. For instance, the controller 3 may also be configured to obtain information regarding lighting attributes and/or classified lighting attributes related to lighting scenes created by the further lighting control systems 9, 9', and to create the lighting scene of the lighting calendar event taking into account the obtained information regarding lighting attributes and/or classified lighting attributes related to lighting scenes created by the further lighting control systems 9, 9'.

In the following, the invention will be described in further detail by means of a number of examples illustrating practical uses of a lighting control system 1 according to the invention.

Example 1— Lighting Control System Illuminating the Empire State Building

Consider a connected lighting control system 1 installed on a lighting venue being an infrastructure such as a bridge or landmark building. It is desired to generate lighting scenes that are suited to events on a lighting calendar. In this example concepts of the invention are explained by considering that the Empire State Building is to be lit by lighting scenes for a lighting calendar event being a concert with a music band, which in this example will be called BTS.

Figure 3:
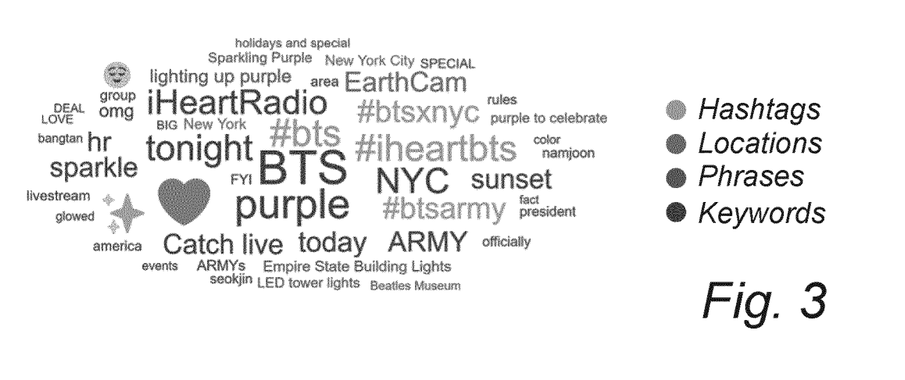
FIG. 3 shows a first exemplary result of data mining on social media to obtain first data, second data and/or third data according to the invention.

For the given lighting calendar event, lighting attributes are determined using social media mining of the calendar event. In FIG. 3, the result of an exemplary thought social media text mining on BTS is shown in relation to a future event. Based on this text mining, lighting attributes such as "sparkling purple", "glow" and "color" are determined, along with indirect cues for images like "purple heart" as well as attributes for customizing messages such as hashtags (#bts, #btsarmy etc.).

A similar process may be executed using social image mining and social video mining to determine additional lighting attributes in the form of images and video scenes.

Based on the lighting attributes, a controller 3 controls a lighting module 2 of the connected lighting control system 1 to generate pertinent lighting scenes. In this example, LED lighting showing purple color, displaying various glows, displaying a purple heart are used. These are then applied to the said calendar event, i.e. during the concert with BTS. During the course of the event (and optionally also subsequently in time), social media sensing and sentiment analysis is performed on the lighting scenes to assign different sentiments to the lighting scenes.

Figure 4:
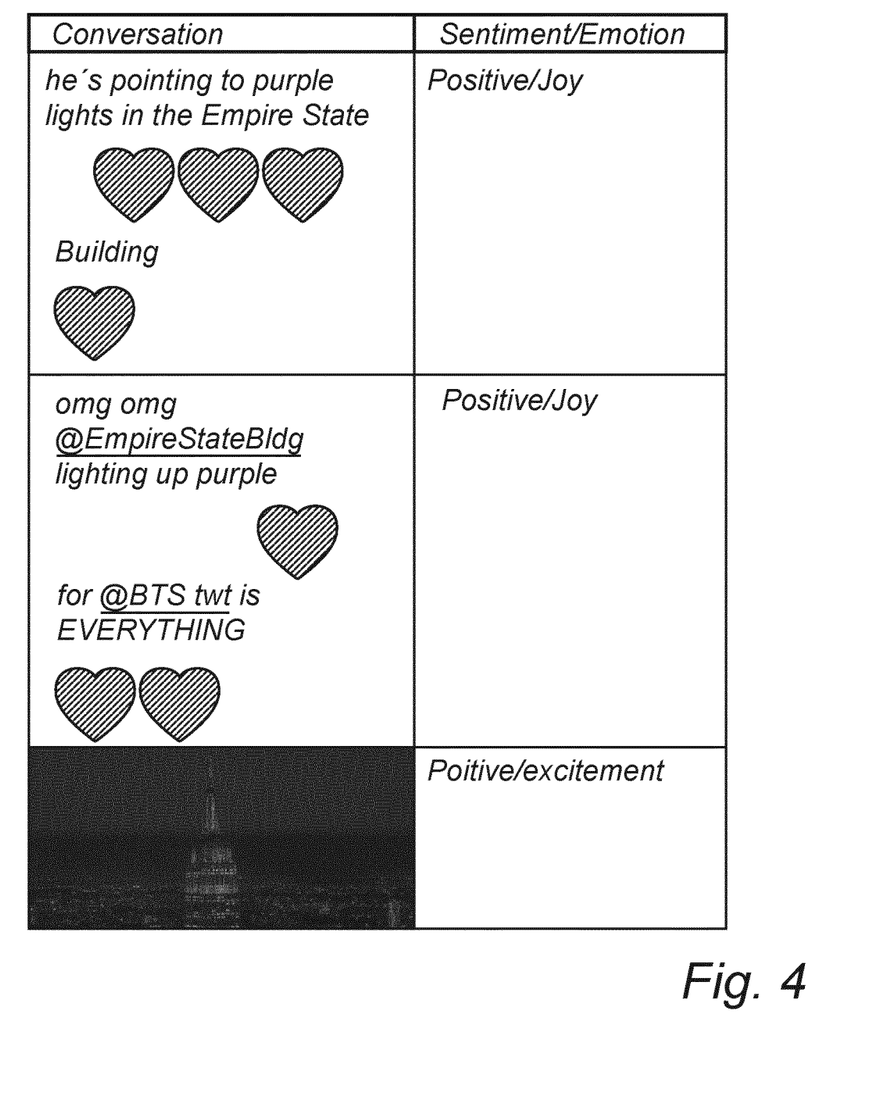
FIG. 4 shows an illustrative result of sentiment/emotion analysis performed on the data obtained according to FIG. 3.

An illustrative result of sentiment/emotion analysis is shown in FIG. 4, where hatching is intended to symbolize the color purple as used in this example, and where conversations during and after the event are captured using social mining and classified for sentiment (positive/negative/neutral) and emotion (e.g. joy/excitement/sadness/anger). In particular, live conversations in the vicinity (established using time and geo-tag information) of the event are used to adapt a lighting scene. Thus scenes that are classified to evoke positive sentiments and emotions may get replicated and/or adapted, while those classified to evoke negative sentiments and emotions are dropped. Thus, classified lighting attributes are obtained.

Furthermore, sentiment/emotion classification results from real-time and future social conversations are used to create and manage lighting scenes of future events (future concerts or other events featuring BTS in this example) at other lighting venues (e.g. at Wembley), taking into account local geographical characteristics. To determine the said characteristics, conversations around Wembley, and also cross-conversations around Wembley and Empire State Building are analysed to extract lighting specific characteristics of past events.

Figure 5:
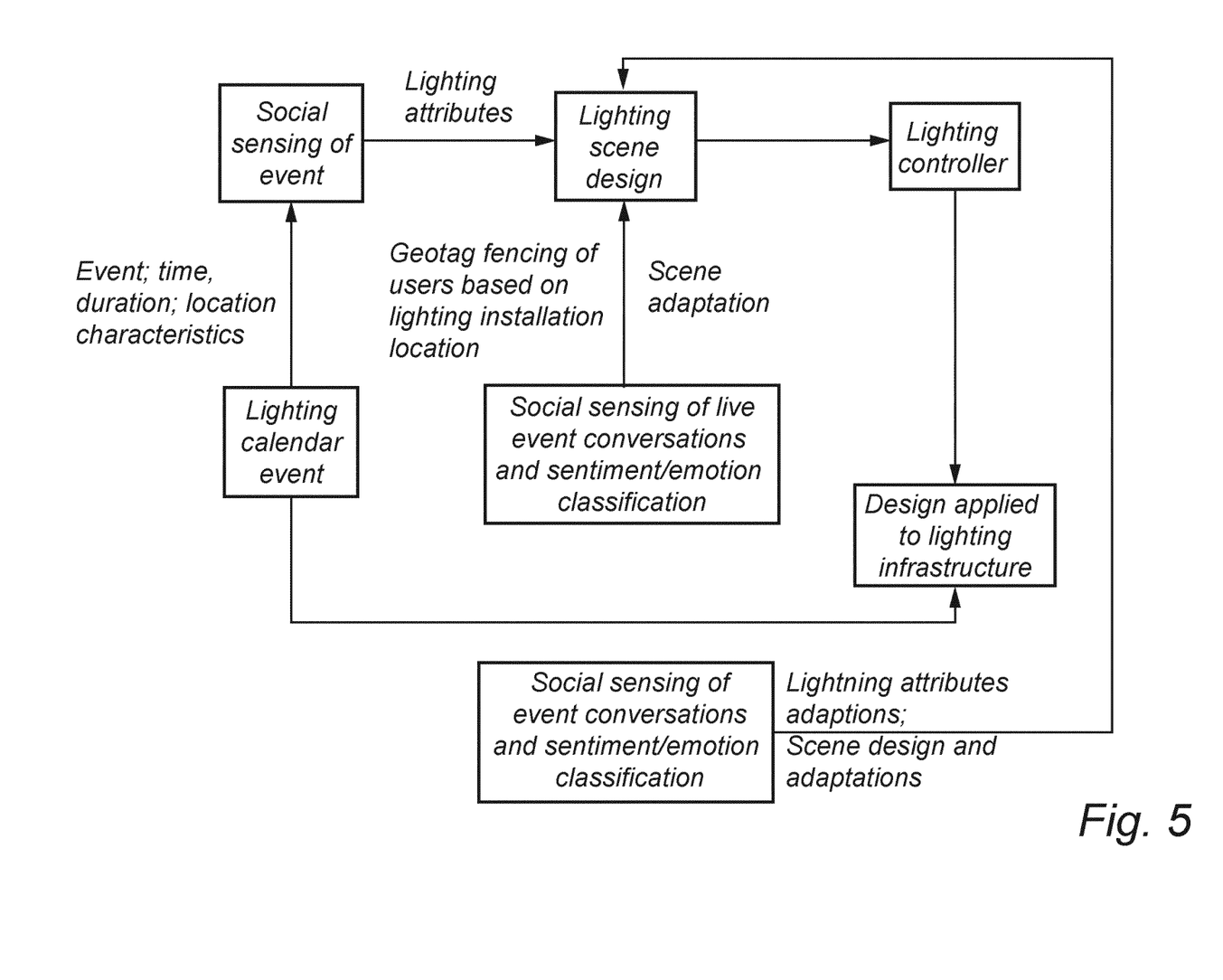
FIG. 5 shows a schematic diagram illustrating the information flow in a system according to the invention.

The steps and information system flow of this example may as described above be illustrated as shown in FIG. 5.

Example 2—Lighting Controls for London Bridges Along the Thames River

In this example, a connected lighting control system 1 installed on an infrastructure consisting of multiple bridges along a river or disparate and geographically distributed landmark buildings is considered. In this example, further concepts of the present invention are explained by considering that lighting control systems are arranged at bridges in London along the Thames river.

Figure 6:
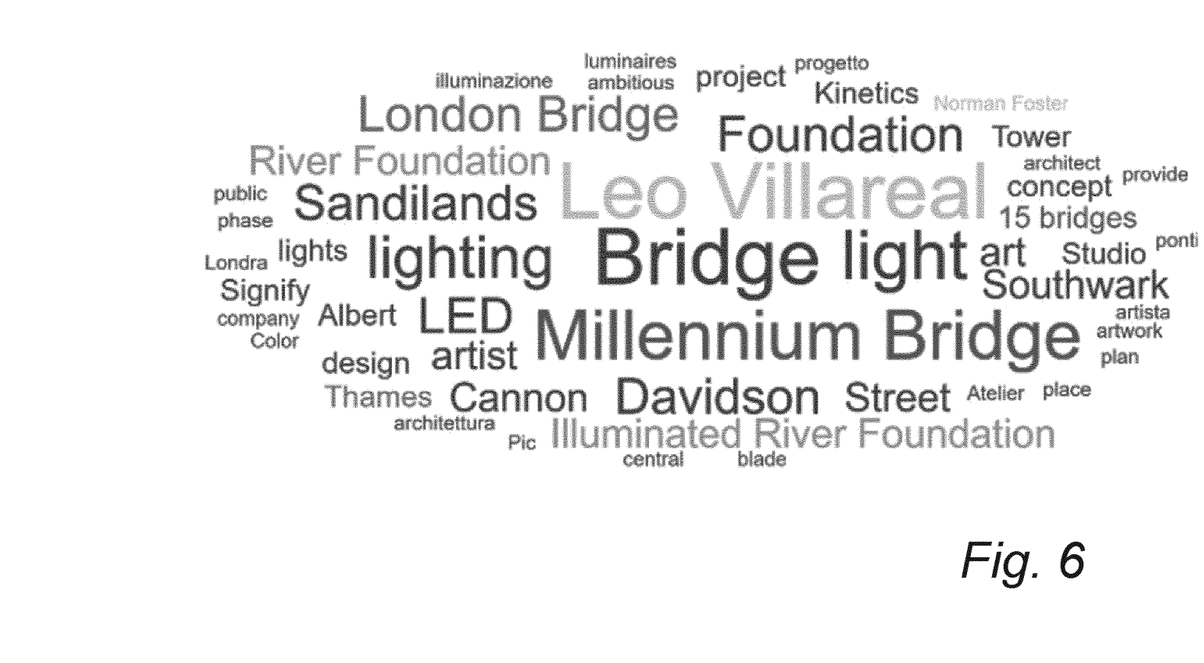
FIG. 6 shows a second exemplary result of data mining on social media to obtain first data, second data and/or third data according to the invention.

Social sensing data in the form of social media conversations and smartphone sensor data, such as accelerometer, GPS and/or Bluetooth data, is collected. This data is used to identify landmarks, here London bridges, to be connected, e.g. based on past history or an artistic link between two bridges. Such a connection may be established using text or multimedia mining to obtain common conversations and keywords to identify bridges that could be grouped. The result of an exemplary thought word cloud analysis is shown in FIG. 6, and indicates that the Millennium bridge and London bridge generate a higher volume of conversations than Southwark bridge or other bridges.

Other social sensing data, such as accelerometer, GPS and/or Bluetooth data, may be used to obtain trajectories of users over bridges, and also identify hot spots. This can be used to establish a connectivity between bridges, e.g. based on volume of people, based on movement.

Social media sensing based on sentiments and emotions may also be used to connecting a link between two bridges, e.g. bridges with diverse sentiment may be connected as a means to showcase diversity.

Social media sensing data based on topics and sentiments may also be used to create links between bridges. For instance, topics may be safety and light pollution. Thus, lights over bridges may be dimmed based on average activity levels and light levels in the vicinity, an illustration indicated below.

Lighting attributes such as colors, intensity, are devised to light said landmarks. Lighting scenes are controlled based on the said attributes for the said landmarks, wherein the lighting can be used to establish a harmony or emphasize a historic/artistic (dis)similarity.

Social media sensing may be used to identify creation of lighting scenes to celebrate events that may be relevant to two landmarks. By way of example, England winning the World Cup and monuments being in London, or celebrating Earth Day and lighting landmark buildings like Empire State Building and Eiffel Tower in white. Specifically, social media sensing is used to identify lighting attributes pertinent to an event, for example sporting color of finalists and winner or colors commemorating an event, that might be used to control lighting.

Example 3

In this example, consider that Madonna is going to perform in New York City, and will play a song called Purple Rain. A lighting control system 1 according to the invention is provided at the Empire State Building, and is used to create a lighting scene illuminating the Empire State Building in purple, because data mining reveals that everybody before the event is talking on social media about #purple. During Madonna's performance, data mining on social media is performed and show that people are talking on social media about how nice the white dress Madonna is wearing on stage is. Based on this, the lighting control system 1 is operated to turn the colors of lighting scene more white, i.e. matching the ongoing social buzz on the white dress. Also, people are complaining on social media that the purple Empire State Building is hardly visible in the night sky. Based on this, the lighting control system 1 is operated to increase the intensity or brightness of the lighting scene. Thereby, the control system is rendering an updated lighting scene based on both the social sensing data mined related to the lighting scene as well as related to the lighting calender event.

The person skilled in the art realizes that the present invention by no means is limited to the preferred embodiments described above. On the contrary, many modifications and variations are possible within the scope of the appended claims.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A lighting control system comprising at least one lighting module and a controller, the controller being configured to control the at least one lighting module to create a lighting scene for a lighting calendar event, the controller further being configured to:
   obtain first data by data mining social media content relating to the lighting calendar event;
   determine at least one first lighting attribute from the first data;
   based on the at least one first lighting attribute, control the at least one lighting module to generate at least one lighting scene and apply the at least one lighting scene for the lighting calendar event;
   obtain second data by data mining social media content relating to the applied at least one lighting scene;
   determine at least one second lighting attribute from the second data; and
   based on the at least one second lighting attribute, control the at least one lighting module to generate at least one updated lighting scene and apply the at least one updated lighting scene for the lighting calendar event.

2. The lighting control system according to claim 1, wherein the controller further is configured to:
   obtain third data by one of repeated data mining and real time data mining social media content relating to the lighting calendar event during the course of the lighting calendar event;
   determine at least one third lighting attribute from the third data; and
   based on the at least one second lighting attribute and the at least one third lighting attribute, control the at least one lighting module to generate the least one updated lighting scene and apply the at least one updated lighting scene for the lighting calendar event.

3. The lighting control system according to claim 1, wherein the second data is obtained by any one of: repeated and real time data mining social media content of the applied at least one lighting scene during the course of the lighting calendar event.

4. The lighting control system according to claim 1, wherein the controller further is configured to:
   classify the at least one first lighting attribute to obtain at least one classified first lighting attribute; and
   based on the at least one classified first lighting attribute, control the at least one lighting module to generate at least one lighting scene and apply the at least one lighting scene for the lighting calendar event.

5. The lighting control system according to claim 4, wherein the classification is performed based on at least one of geographical data, sentiment data and emotion data achieved through said data mining social media content.

6. The lighting control system according to claim 1, wherein the controller further is configured to:
   classify at least one of the at least one second lighting attribute and/or the at least one third lighting attribute to obtain respectively at least one classified second lighting attribute and at least one classified third lighting attribute; and
   based on at least one of the at least one classified second lighting attribute and/or the at least one classified third lighting attribute, control the at least one lighting module to generate the at least one updated lighting scene and apply the at least one updated lighting scene for the lighting calendar event.

7. The lighting control system according to claim 1, wherein at least one of the second data and the third data are further obtained by repeated data mining social media content relating to the applied lighting scene subsequently to the lighting calendar event having ended.

8. The lighting control system according to claim 1, wherein the controller further is configured to:
   create and/or manage lighting scenes of a lighting event subsequent to the lighting calendar event taking into account at least one of the at least one first lighting attribute, the at least one second lighting attribute, the at least one third lighting attribute, the at least one first classified lighting attribute, the at least one second classified lighting attribute and the at least one third classified lighting attribute.

9. The lighting control system according to claim 1, wherein the lighting control system is arranged at or linked to a lighting venue, and wherein the lighting venue is a landmark.

10. The lighting control system according to claim 1, wherein the controller further is configured to:
    obtain information regarding at least one of first lighting attributes, second lighting attributes, third lighting attributes, first classified lighting attributes, second classified lighting attributes and third classified lighting attributes related to lighting scenes created by a further lighting control system; and
    create the lighting scene of the lighting calendar event taking into account the thus obtained information.

11. The lighting control system according to claim 10, wherein the further lighting control system is arranged at or linked to a further lighting venue, and wherein the further lighting venue is a further landmark.

12. The lighting control system according to claim 1, wherein the data mining comprises one or more of social text mining, social multimedia mining, social image mining, social video mining, social sensor mining, mining of sensor data from smartphones and emoticon processing.

13. The lighting control system according to claim 1, wherein the at least one lighting module comprises a plurality of light sources adapted for, in operation, emitting light, and the controller is adapted for causing the at least one lighting module to provide, using the plurality of light sources, a light output with light properties comprising one or more of color, glow, color temperature, intensity and shape.

14. A method for operating a lighting control system comprising at least one lighting module and a controller, the controller being configured to perform the steps:
    obtain first data by data mining social media content relating to the lighting calendar event;
    determine at least one first lighting attribute from the first data;
    based on the at least one first lighting attribute, control the at least one lighting module to generate at least one lighting scene and apply the at least one lighting scene for the lighting calendar event;
    obtain second data by data mining social media content relating to the applied at least one lighting scene;
    determine at least one second lighting attribute from the second data; and
    based on the at least one second lighting attribute control the at least one lighting module to generate at least one updated lighting scene and apply the at least one updated lighting scene for the lighting calendar event.

15. The method according to claim 14, wherein the controller further is configured to perform one or more of the steps:
- obtain third data by one of repeated data mining and real time data mining social media content relating to the lighting calendar event during the course of the lighting calendar event;
- determine at least one third lighting attribute from the third data; and
- based on at least one of the at least one second lighting attribute and the at least one third lighting attribute controlling the at least one lighting module to generate at least one updated lighting scene and apply the at least one updated lighting scene for the lighting calendar event.

* * * * *